(12) United States Patent
Heath et al.

(10) Patent No.: US 10,293,552 B2
(45) Date of Patent: May 21, 2019

(54) HEAT SHRINKABLE FILM TUBE AND METHOD FOR MANUFACTURING HOLLOW COMPOSITE PARTS

(71) Applicant: The Boeing Company, Chicago, IL (US)

(72) Inventors: Richard Heath, Mt. Pleasant, SC (US); Andrew Elmer Modin, Charleston, SC (US)

(73) Assignee: The Boeing Company, Chicago, IL (US)

( * ) Notice: Subject to any disclaimer, the term of this patent is extended or adjusted under 35 U.S.C. 154(b) by 671 days.

(21) Appl. No.: 14/943,516

(22) Filed: Nov. 17, 2015

(65) Prior Publication Data
US 2017/0136687 A1 May 18, 2017

(51) Int. Cl.
B29C 35/02 (2006.01)
B29C 65/00 (2006.01)
B29C 47/00 (2006.01)
B29C 47/06 (2006.01)
B29C 65/02 (2006.01)
B29C 65/66 (2006.01)
B29C 70/44 (2006.01)
(Continued)

(52) U.S. Cl.
CPC .............. *B29C 66/49* (2013.01); *B29C 35/02* (2013.01); *B29C 47/0026* (2013.01); *B29C 47/067* (2013.01); *B29C 65/02* (2013.01); *B29C 65/66* (2013.01); *B29C 66/112* (2013.01); *B29C 66/131* (2013.01); *B29C 66/536* (2013.01); *B29C 66/721* (2013.01); *B29C 66/7371* (2013.01); *B29C 66/8122* (2013.01); *B29C 66/81431* (2013.01); *B29C 66/81455* (2013.01); *B29C 70/446* (2013.01); *B29C 66/524* (2013.01); *B29C 66/7392* (2013.01); *B29C 66/7394* (2013.01); *B29C 66/73751* (2013.01); *B29C 66/73753* (2013.01); *B29L 2009/00* (2013.01); *B29L 2023/00* (2013.01); *B29L 2031/003* (2013.01); *B29L 2031/3076* (2013.01)

(58) Field of Classification Search
CPC ................................ B29C 66/49; B29C 35/02
See application file for complete search history.

(56) References Cited

U.S. PATENT DOCUMENTS 5,387,098 A 2/1995 Willden
6,544,367 B1 4/2003 Fujimoto et al.
(Continued)

FOREIGN PATENT DOCUMENTS

EP 0582160 A1 * 2/1994
RU 115434 U1 4/2012
(Continued)

OTHER PUBLICATIONS

Lee et al., "Method, Device and Apparatus for Vacuum Forming Composite Laminates," U.S. Appl. No. 14/527,162, filed Oct. 29, 2014, 47 pages.
(Continued)

Primary Examiner — Jeffry H Aftergut
(74) Attorney, Agent, or Firm — Yee & Associates, P.C.

(57) ABSTRACT

A film tube installed and sealed in a hollow composite part acts as an internal vacuum bag that eliminates the need for an internal mandrel to react compaction forces applied by autoclave pressure during curing of the part.

22 Claims, 15 Drawing Sheets

(51) Int. Cl.
  *B29L 9/00* (2006.01)
  *B29L 23/00* (2006.01)
  *B29L 31/30* (2006.01)
  *B29L 31/00* (2006.01)

(56) References Cited

U.S. PATENT DOCUMENTS

| | | |
|---|---|---|
| 6,820,654 B2 | 11/2004 | Lindsay |
| 7,744,974 B2 | 6/2010 | Pearson et al. |
| 7,749,421 B2 | 7/2010 | Callis et al. |
| 8,714,485 B2 | 5/2014 | Matheson et al. |
| 2008/0131716 A1* | 6/2008 | Ridges .................. B29C 63/42 428/523 |
| 2010/0139857 A1 | 6/2010 | Pham et al. |
| 2011/0259508 A1* | 10/2011 | Inserra Imparato .. B29C 33/505 156/182 |
| 2013/0327477 A1 | 12/2013 | Hollensteiner et al. |
| 2014/0314996 A1 | 10/2014 | Stewart |
| 2016/0214329 A1* | 7/2016 | Fernandes ............... B29C 70/34 |

FOREIGN PATENT DOCUMENTS

| | | |
|---|---|---|
| RU | 2457111 C2 | 7/2012 |
| SU | 627990 A1 | 10/1978 |
| SU | 1039730 A1 | 9/1983 |
| WO | WO-2010/143212 A1 * | 12/2010 |

OTHER PUBLICATIONS

Russian Office action and English translation, dated Dec. 22, 2017, regarding Application No. 2016133881/05 (052665), 15 pages.

\* cited by examiner

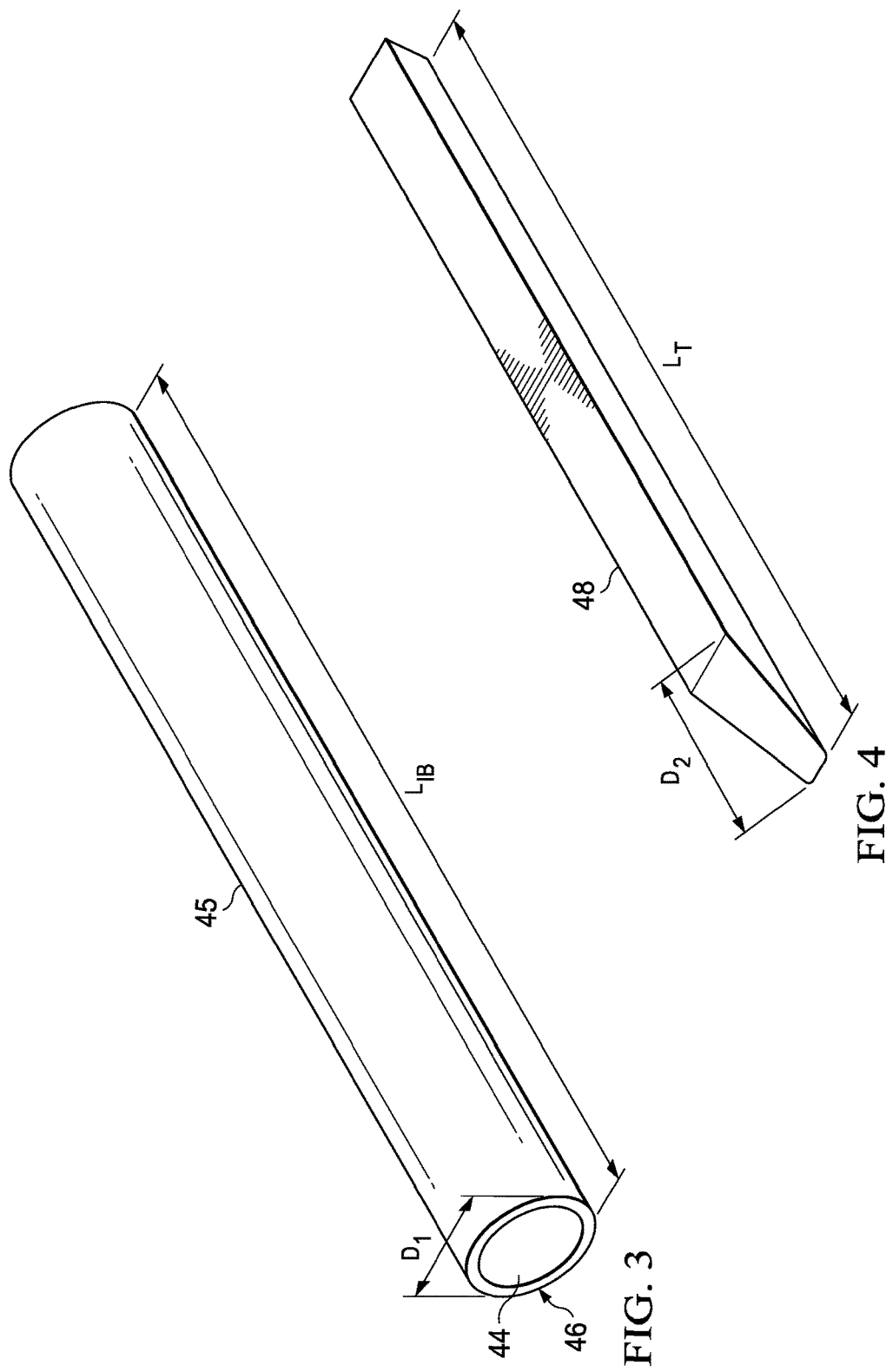

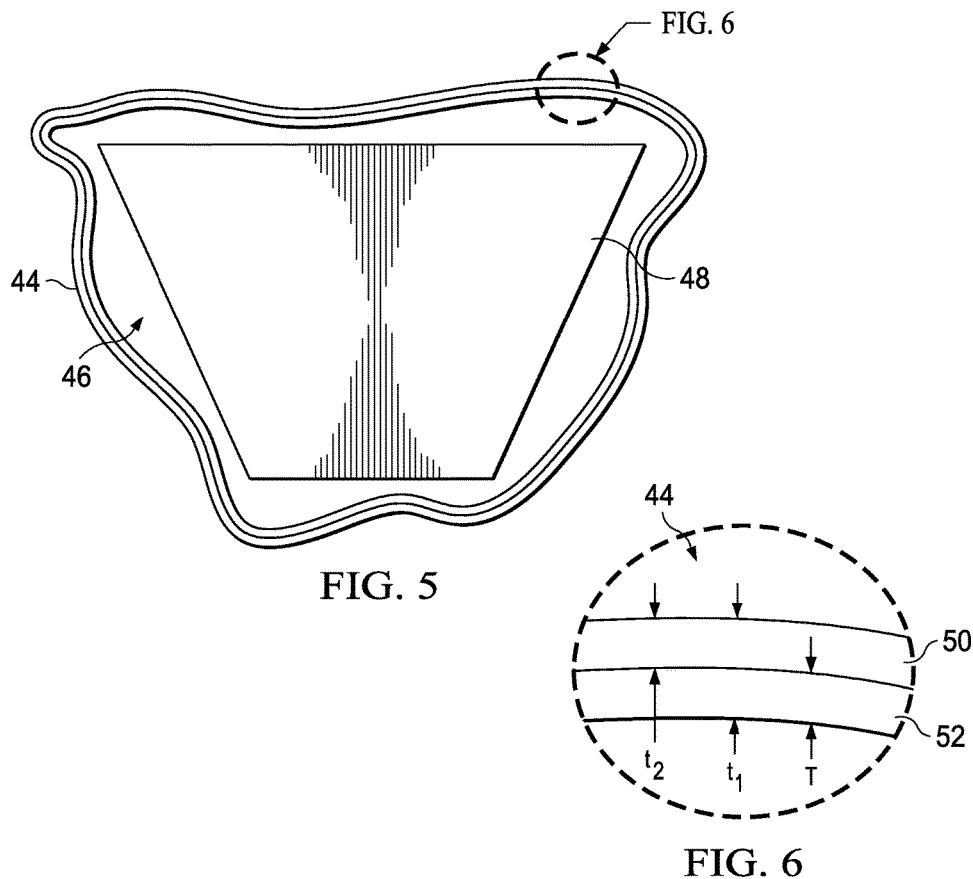
FIG. 5
FIG. 6
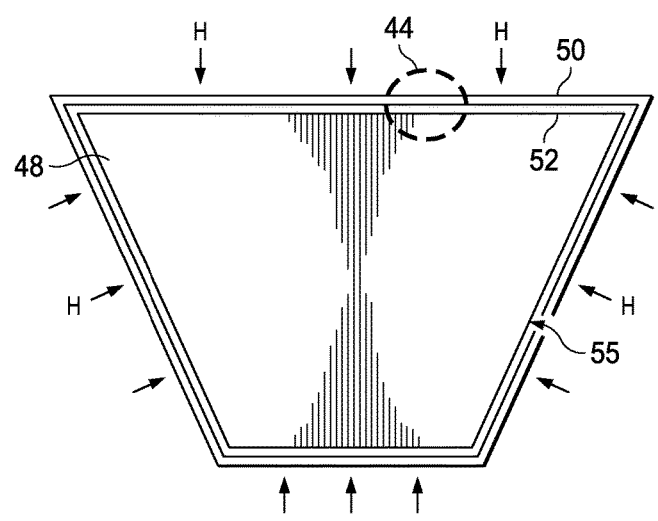
FIG. 7

HEAT SHRINKABLE FILM TUBE AND METHOD FOR MANUFACTURING HOLLOW COMPOSITE PARTS

BACKGROUND INFORMATION

1. Field

The present disclosure generally relates to processing composite parts, and deals more particularly with a method of curing composite parts that are hollow or have a cavity therein.

2. Background

Composite parts that are hollow or contain cavities/recesses may be cured using a combination of heat and pressure in an autoclave. In order to react autoclave pressure and prevent collapse of the part, a mandrel-like tool such as an inflatable bladder wrapped in a single-layer release film is placed in the cavity. Following curing of the part, the bladder is deflated to allow it to be removed from the part. The bladders used in this application are typically made of air impermeable, flexible materials such as elastomers which may degrade over time because of the elevated temperatures to which they are subjected during thermal cure processes.

In other applications, air impermeable vacuum bags with release films have been fitted inside the cavity without a supporting mandrel, however this approach may not provide adequate structure for reacting applied compaction forces. In still other applications, oversized tube type bags have been fitted over internal mandrels, however this solution to the problem may result in unacceptable results because the oversize bags wrinkle and leave mark-off.

Accordingly, there is a need for a method of curing composite parts that are hollow/contain cavities, which eliminates the need for a mandrel providing internal structural support to react applied compaction forces. There is also a need for a film tube that can be installed in a part cavity that functions as a sealed inner vacuum bag that applies autoclave compaction force to the part.

SUMMARY

The disclosed embodiments provide a method of processing composite parts that are hollow or have cavities therein, which eliminates the need for internal mandrels that are normally needed to provide structural support for reacting applied compaction forces. An inner vacuum bag comprising a film tube installed inside the cavity is exposed to autoclave pressure during curing to apply compaction forces to the part. The film tube is heat shrunk around an installation tool such as a mandrel, and results in a smooth, non-wrinkled, substantially deflect free surface on cavity walls of the part. The film tube comprises a release film on the outer surface, and an air impermeable barrier film on the inner surface of the tube. The release film and the barrier film may be coextruded to form a film tube having a diameter that is marginally greater than the widest cross-sectional dimension of the installation tool. Following installation of the film tube, the installation mandrel is removed, exposing the film tube to autoclave pressure.

According to one disclosed embodiment, a method is provided of processing a composite part. The method comprises placing a composite part on a tool having a tool cavity, applying a film over an outer surface of a mandrel, and placing the mandrel inside a cavity in the composite part. The method also includes attaching the film to walls of the tool cavity, and removing the mandrel from the cavity in the composite part. Applying the film over the outer surface of the mandrel may include sleeving a film tube over the mandrel and shrinking the film onto the mandrel. Attaching the film to the walls the cavity may include sealing opposite ends of the film tube to the tool. The method may further comprise sealing a vacuum bag over the composite part and attaching opposite ends of the film tube to the vacuum bag. The method may further comprise curing the composite part, including applying autoclave pressure to the film inside the cavity. Applying the film includes shrink wrapping a release film and an air impermeable barrier film onto the mandrel According to another disclosed embodiment, a method is provided of applying a vacuum bag over a composite part. The method comprises placing the composite part on a tool having a tool cavity, applying a film over an outer surface of a mandrel and placing the mandrel inside a cavity in the composite part. The method also includes attaching the film to walls of the tool cavity, and removing the mandrel from the cavity in the composite part.

According to a further disclosed embodiment, a method is provided of bagging a composite part having a cavity therein, comprising applying a cavity vacuum bag over the inner surface of the cavity in the composite part, applying an outer vacuum bag over the composite part, sealing the cavity vacuum bag to the outer vacuum bag and to a tool, and sealing the outer vacuum bag to the tool.

According to still another disclosed embodiment, a method is provided of fabricating a composite part having a cavity therein. The method comprises placing a flexible inner bag around a mandrel, shrink wrapping the inner bag onto an outer surface of the mandrel, and placing the composite part on a tool. The method also includes placing the mandrel in the cavity, sealing the inner bag to the tool, and removing the mandrel from the cavity. The method further comprises sealing the outer bag over the composite part, sealing the inner bag to the outer bag, and curing the composite part in an autoclave. Placing the flexible inner bag around a mandrel may be performed by enveloping the mandrel with an air impermeable inner film, and enveloping the inner film with an outer release film. Placing the flexible inner bag may be performed by sleeving a film tube over the mandrel. Sealing the inner bag to the tool may be performed by sealing outer ends of the film to the tool around substantially the entire circumference of the tube. Shrink wrapping the inner bag may be performed by applying heat to the flexible inner bag until the inner bag shrinks onto the surface of the mandrel. Sealing the inner bag to the outer bag may be performed by exposing portions of an inner face of the inner bag by folding over opposite ends of the inner bag, and adhering the portions of the inner face to the outer bag. Curing the part may be performed by placing the composite part and the tool in an autoclave, and exposing the outer bag and the inner bag to autoclave pressure.

According to still another disclosed embodiment, a method is provided of fabricating a composite stringer having a cavity therein. The method comprises placing a composite stringer charge on a tool, and installing a flexible outer film bag over the composite stringer charge covering the cavity. The method further comprises placing a flexible inner film bag in the cavity, and compacting the composite stringer charge by applying pressure to the inner vacuum bag and to the outer vacuum bag. Placing the inner film bag inside the cavity may be performed by shrink wrapping an air impermeable barrier film tube around the mandrel, placing the mandrel inside the cavity, attaching the barrier film to the tool and removing the mandrel from the cavity. Applying pressure to the inner film bag and to the outer film bag may be performed by placing the composite stringer charge and the tool in an autoclave, and subjecting the inner and outer film bags to autoclave pressure. The pressure may be applied using a common pressure source. Applying pressure using a common pressure source may include placing the composite stringer charge in an autoclave, and subjecting the inner film bag and the outer film bag to autoclave pressure.

According to still further embodiment, a method is provided producing a vacuum bag adapted to envelop a mandrel, comprising co-extruding an inner film tube and an outer film tube. The co-extruding may include liquefying a barrier material, liquefying a release material, feeding the liquefied barrier material and release material to an extrusion machine, and extruding the liquefied barrier material and release material through an extrusion die. The method may also include extruding a layer of adhesive between the inner film tube and the outer film tube.

According to another disclosed embodiment, a vacuum bag is provided that is adapted to sleeved over a mandrel. The vacuum bag comprises an air impermeable inner barrier film tube adapted to conform to the outer surface of the mandrel, and an outer release film tube surrounding the inner barrier film tube. The inner barrier film tube may be bonded to the outer film tube. Each of the inner barrier film tube and the outer release film tube is formed of heat shrinkable materials.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and advantages thereof, will best be understood by reference to the following detailed description of an illustrative embodiment of the present disclosure when read in conjunction with the accompanying drawings, wherein:

FIG. 3 is an illustration of a perspective view of a film tube.

FIG. 4 is an illustration of a perspective view of a mandrel used to install the film tube in the cavity of the tool.

FIG. 5 is an illustration of an end view of a mandrel having the film tube of FIG. 3 loosely sleeved thereover.

FIG. 6 is an illustration of the area designated as FIG. 6 in FIG. 5.

FIG. 7 is an illustration similar to FIG. 5, but showing the film tube having been shrink-wrapped onto the outer surface of the mandrel.

DETAILED DESCRIPTION

Figure 1:
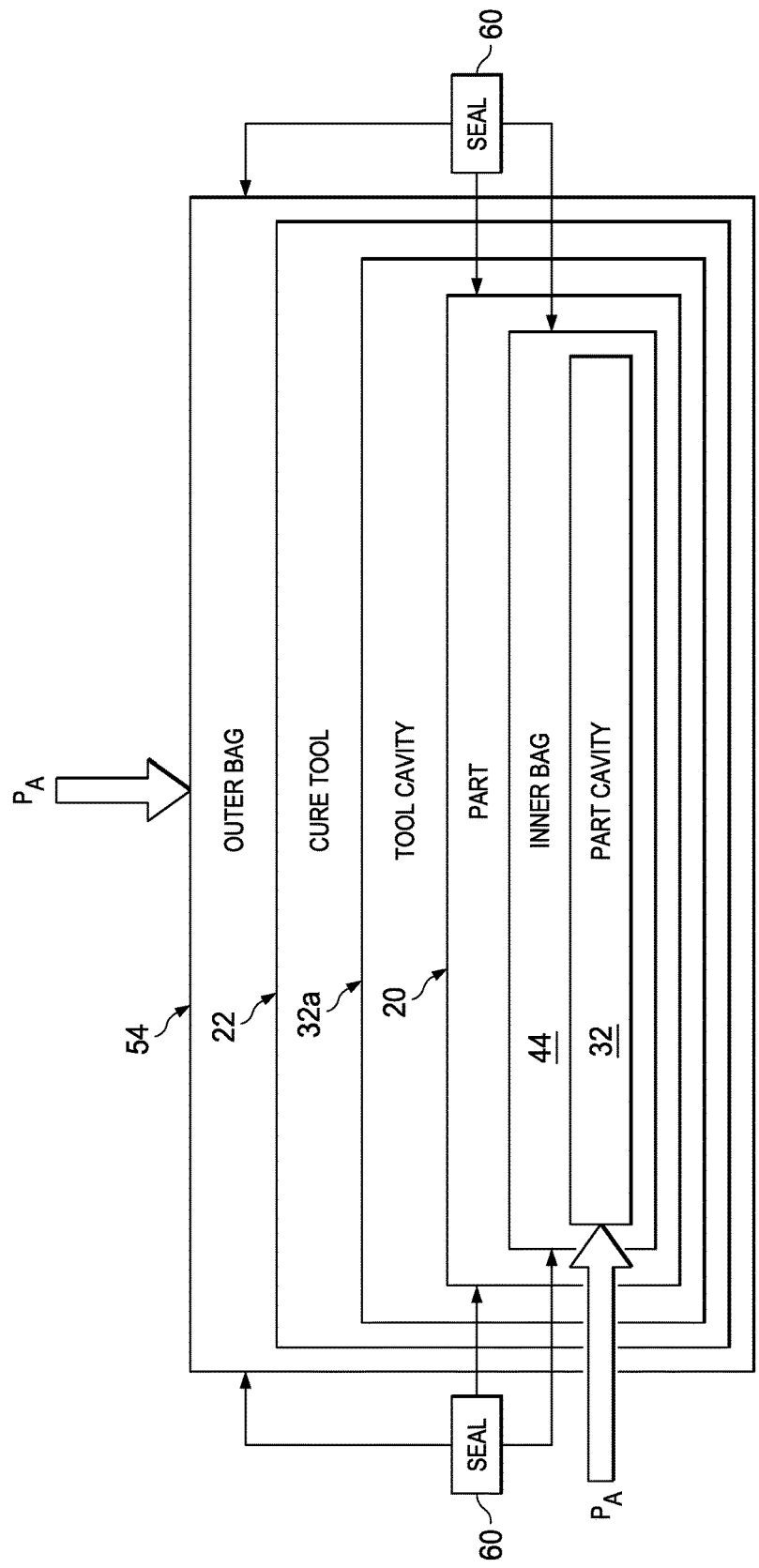
FIG. 1 is an illustration of a simplified a block diagram of apparatus for curing a composite part.

Referring to FIG. 1, the disclosed embodiments relate to processes for processing a composite part 20, where the part 20 is hollow or contains one or more cavities 32 or similar recesses that are open to the surrounding atmosphere. The processes may include, but are not limited to compacting and/or curing the part. During the fabrication process, the part 20 may be placed in a tool, such as a cure tool 22 in which a composite preform is cured in an autoclave (not shown). The cure tool 22 includes a tool cavity 32a shaped to complement the cavity 32 in the part 20. As will be described later in more detail, a flexible inner vacuum bag 44 is placed in the cavity 32 of the part 20, and an outer bag 54 is placed over the part 20 and sealed to the cure tool 22. The inner bag 44 is sealed by seals 60 to both the cure tool 22 and to the outer vacuum bag 54. During curing of the part 20 in the autoclave, autoclave pressure $P_A$ is applied to the outer bag 54, which causes compaction pressure to be applied to the part 20 from outside the tool 22. The outer bag 54 may also be evacuated.

Additionally, because the cavity 32 is open to the surrounding atmosphere, autoclave pressure $P_A$ is also applied to the inner bag 44, causing compaction pressure to be applied to the part 20 from inside the cavity 32. The inner bag 44 may, but need not be evacuated. The ability of the inner bag 44 to apply compaction pressure to the part 20 obviates the need for an internal mandrel (not shown). Moreover, elimination of the need for an internal mandrel reduces part variations caused by thermal expansion of the mandrel.

Figure 2:
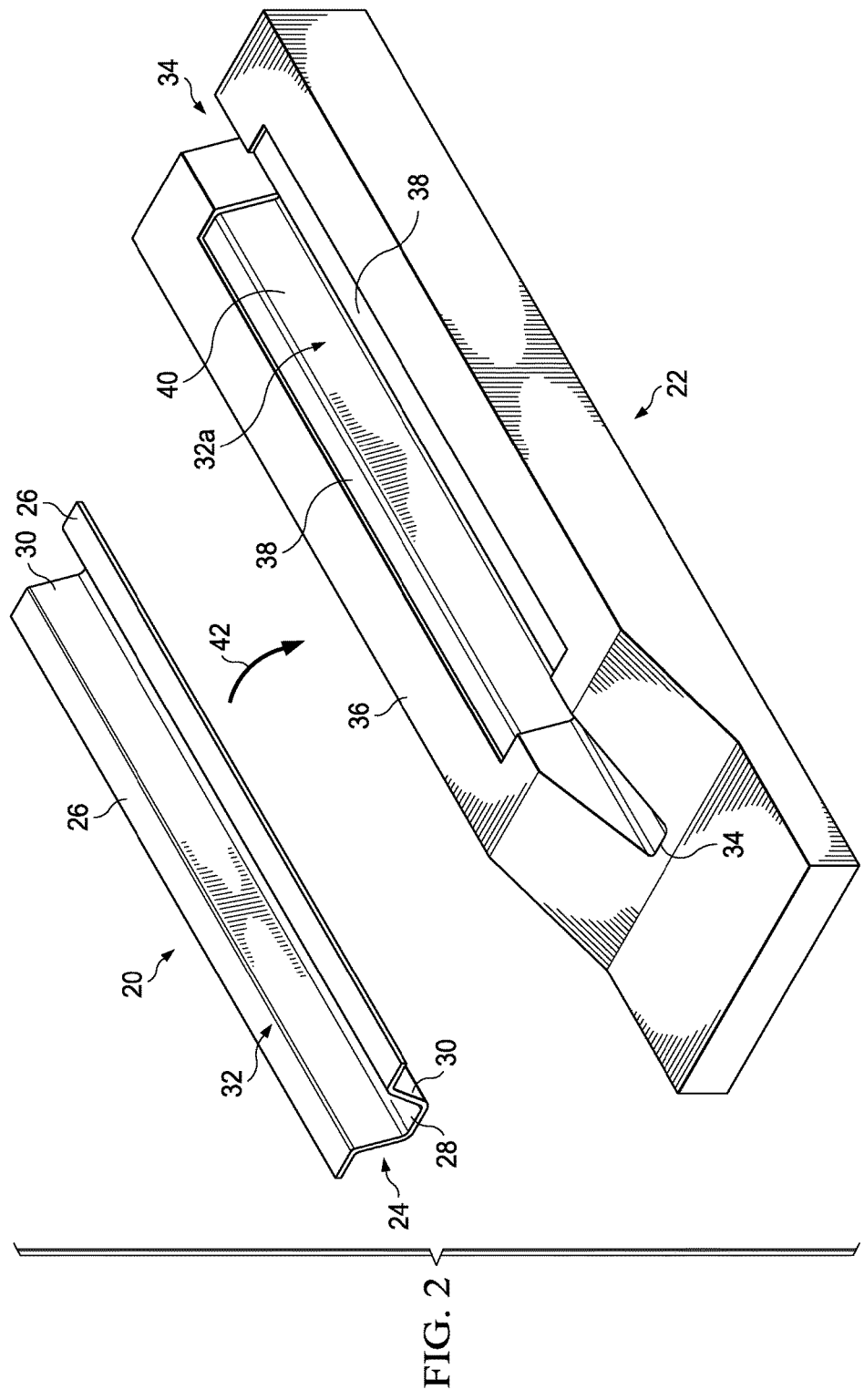
FIG. 2 is an illustration of a perspective view of a cure tool, showing a composite stringer about to be placed in a cavity in the tool.
Figure 10:
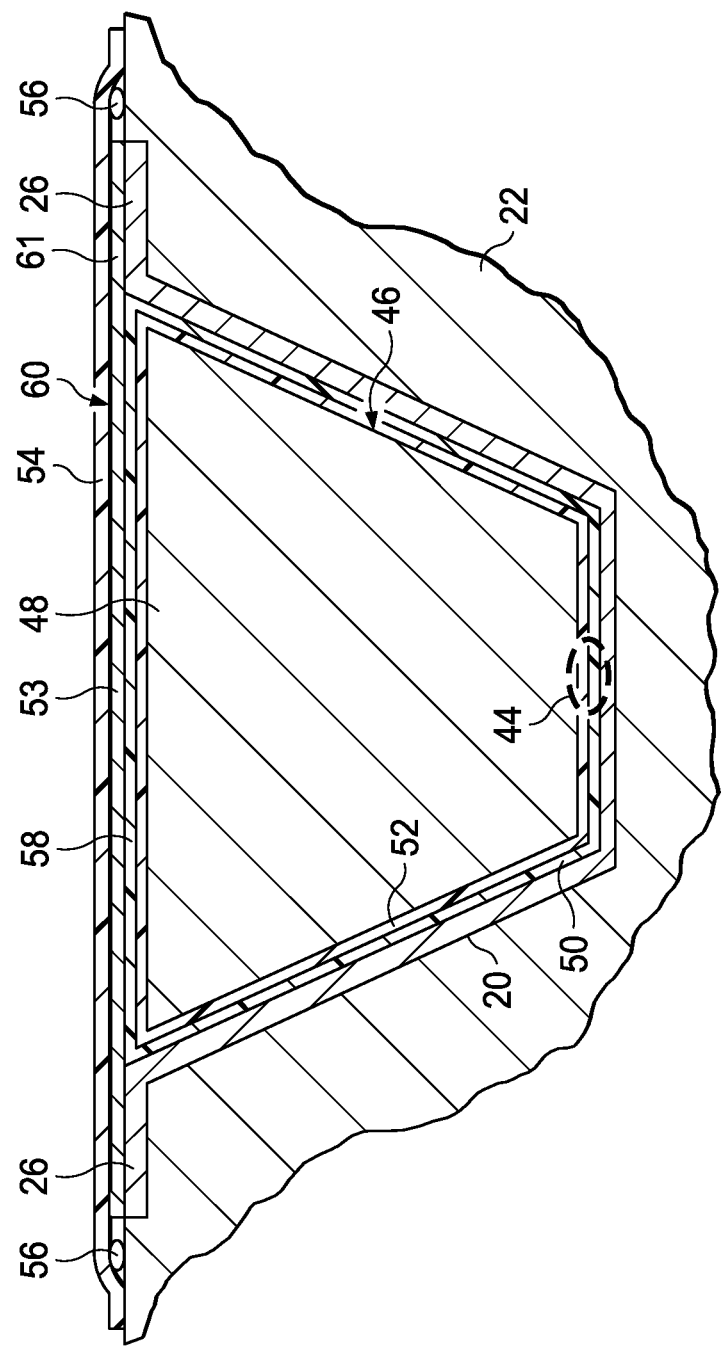
FIG. 10 is an illustration of a cross sectional view taken along the line 10-10 in FIG. 9.

The disclosed method can be employed to process a wide range of composite parts 20, formed of thermoplastic or thermoset composite laminates. For example, FIG. 2 illustrates a preformed, green stringer 20, sometimes also referred to as a stringer charge 20 or stringer preform 20 that may be placed 42 on a cure tool 22 that is used to cure the stringer 20 in an autoclave (not shown). The stringer 20, sometimes referred to as a "hat stringer", includes a hat section 24 formed by a cap 28 connected by webs 30 to outwardly turned flanges 26. The stringer 20 may also have a base 61 (see FIGS. 8 and 10) that spans across the flanges 26. The cure tool 22 includes a cavity 32a that is shaped to complement the shape of the hat section 24. A pair of recesses of 38 in the top 36 of the cure tool 22 respectively receive the flanges 26 of the stringer 20. The opposite ends of the cavity 32a are open 34.

The cure tool 22 maintains the preformed shape of the stringer 20 during curing and reacts compaction forces applied to the stringer 20 during a compaction process and/or the cure process. While a substantially straight stringer 20 has been illustrated, the disclosed method may be employed to compact and/or cure stringers and similar stiffeners that have one or more curves or contours, joggles and/or ply thickness changes along their length.

Referring now to FIGS. 3-6, the inner bag 44 may comprise a flexible film tube 45 (FIG. 3) having an inside diameter $D_1$ that is at least marginally greater than the widest cross-sectional dimension $D_2$ (FIG. 4) of a mandrel 48 used to install the film tube 45 in the stringer cavity 32 (FIG. 2). The film tube 45 has open ends 46 and a length $L_{IB}$ that is greater than length $L_M$ (FIG. 12) the mandrel 48.

As best seen in FIG. 6, the film tube 45 comprises an outer release film layer 50, and an inner barrier film layer 52. The total thickness of the film tube 45 will vary with the application, and depends on the thicknesses $t_1$, $t_2$ of the film layers 50, 52 respectively. The outer release film layer 50 may comprise any suitable heat shrinkable material commonly used as a release film, such as, without limitation, FEP (Fluorinated Ethylene Propylene), ETFE (Ethylene Tetrafluoroethylene) or PTFE (Polytetrafluoroethylene). The inner barrier film layer 52 may comprise any suitable heat shrinkable, air impermeable material commonly used as vacuum bags, including but not limited to Nylon and Polyethylene. As will be discussed below in more detail, the film tube 45 may be produced by coextruding the release film material and the barrier film material, however other manufacturing techniques may be employed.

In use, the film tube 45 is sleeved over the mandrel 48 or other suitable installation tool having a cross sectional shape that is complementary to the cross sectional shape of the part cavity 32 into which the inner bag 44 is to be installed. In the present example, the mandrel 48 may comprise an inflatable bladder having a trapezoidal cross sectional shape that is complementary to the cavity 32 in the stringer 20. After sleeving the film tube 45 over the mandrel 48 as shown in FIG. 5, heat H is applied to the film tube 45, as shown in FIG. 7, causing it to shrink down onto and take the shape of the outer surface 55 of the mandrel 48. The heat H may be applied using any suitable technique, such as by using warm air guns or heat lamps to direct heat onto the film tube 45, or by placing the mandrel 48 in an oven (not shown).

Figure 8:
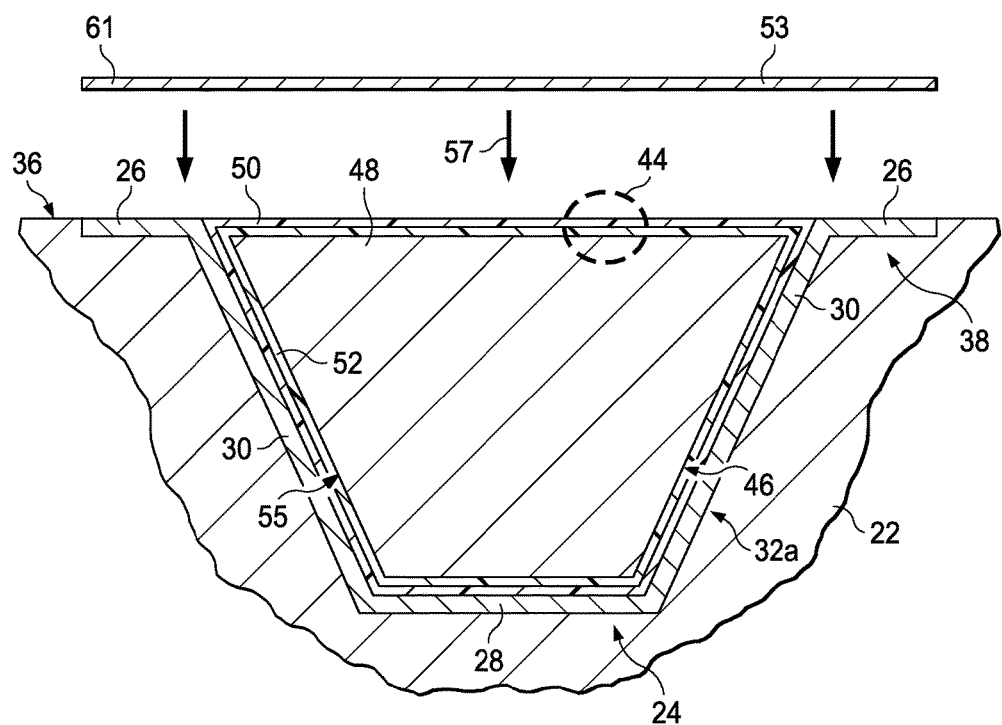
FIG. 8 is an illustration of a transverse, cross-sectional view of the tool shown in FIG. 2 after the stringer and film wrapped mandrel have been installed on the tool.
Figure 9:
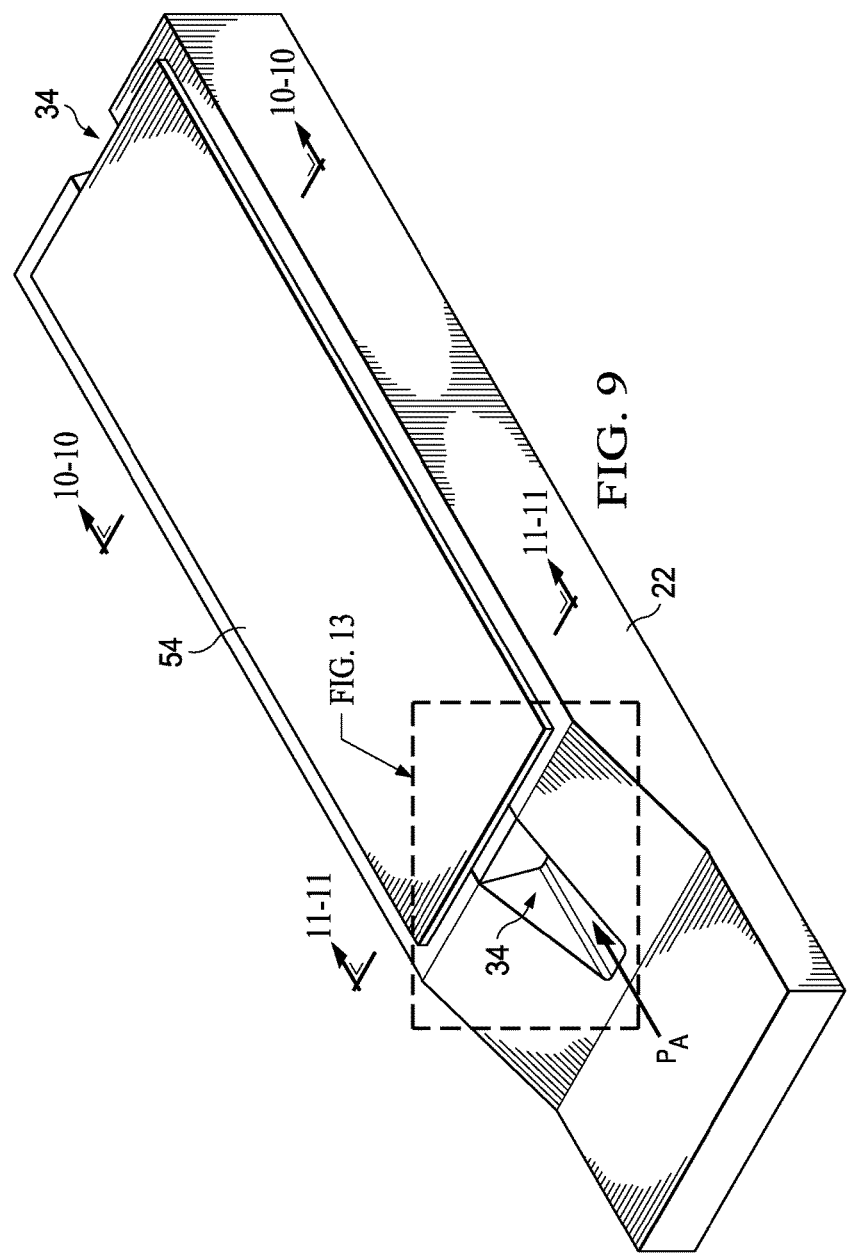
FIG. 9 is an illustration of a perspective view of the tool with the outer vacuum bag having been installed on the tool covering the stringer.

Next, referring to FIG. 8, a pre-formed, green (not fully cured) composite stringer 20 is placed on the tool 22, and the mandrel 48 having the film tube shrunk down onto its outer surface 55, is placed in the stringer cavity 32. Optionally, one or more base plies 53 may then be placed 57 on top of the film wrapped mandrel 48 and the flanges 26. The base plies 53 form a base 61 on the stringer 20 which extends transversely from the outer edge of one of the flanges 26 to the outer edge of the other flange 26, and along substantially the entire length of the stringer 20. The mandrel 48 provides an internal structure that maintains the shape the film tube 45, with barrier film layer 50 in face-to-face contact with the cap 28, the webs 30 and the base plies 53 of the stringer 20, until the film tube installation process has been completed.

Figure 11:
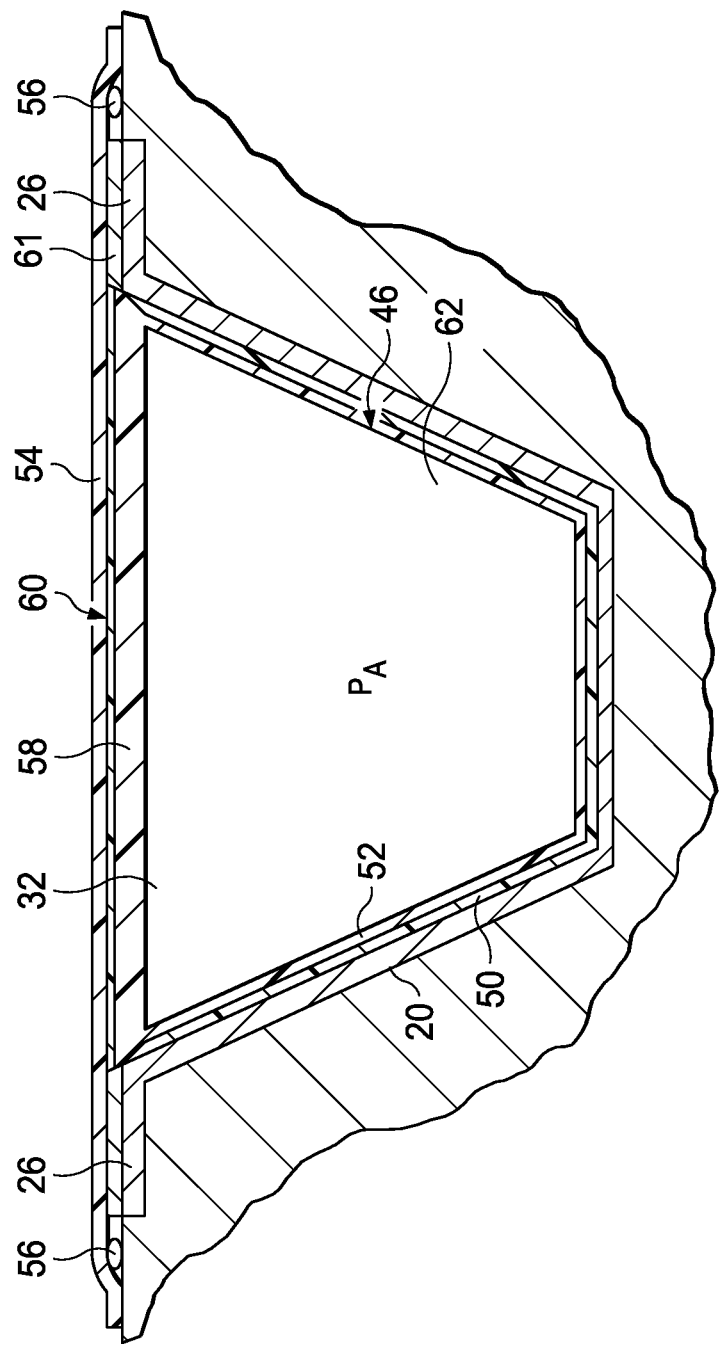
FIG. 11 is an illustration of a cross sectional view taken along the line 11-11 in FIG. 9.
Figure 12:
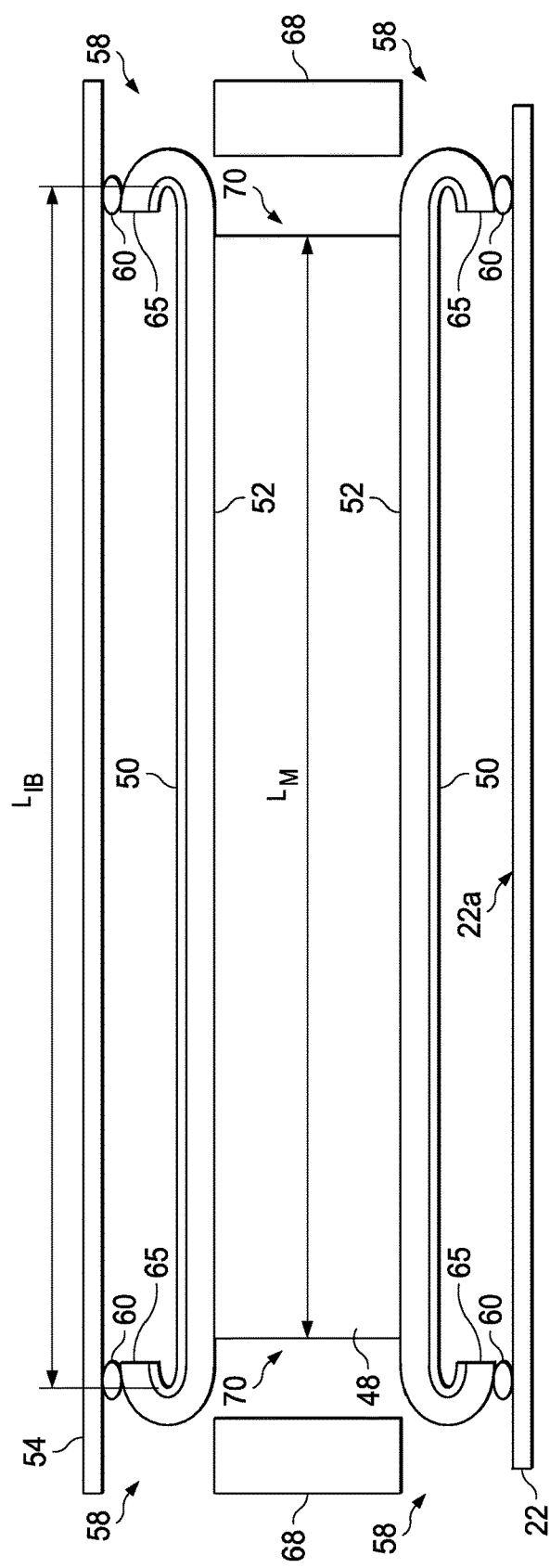
FIG. 12 is an illustration of a longitudinal, diagrammatic view of the assembly shown in FIG. 11, wherein parts are slightly exploded to show how the ends of the film tube are folded over onto themselves to face the outer bag.
Figure 13:
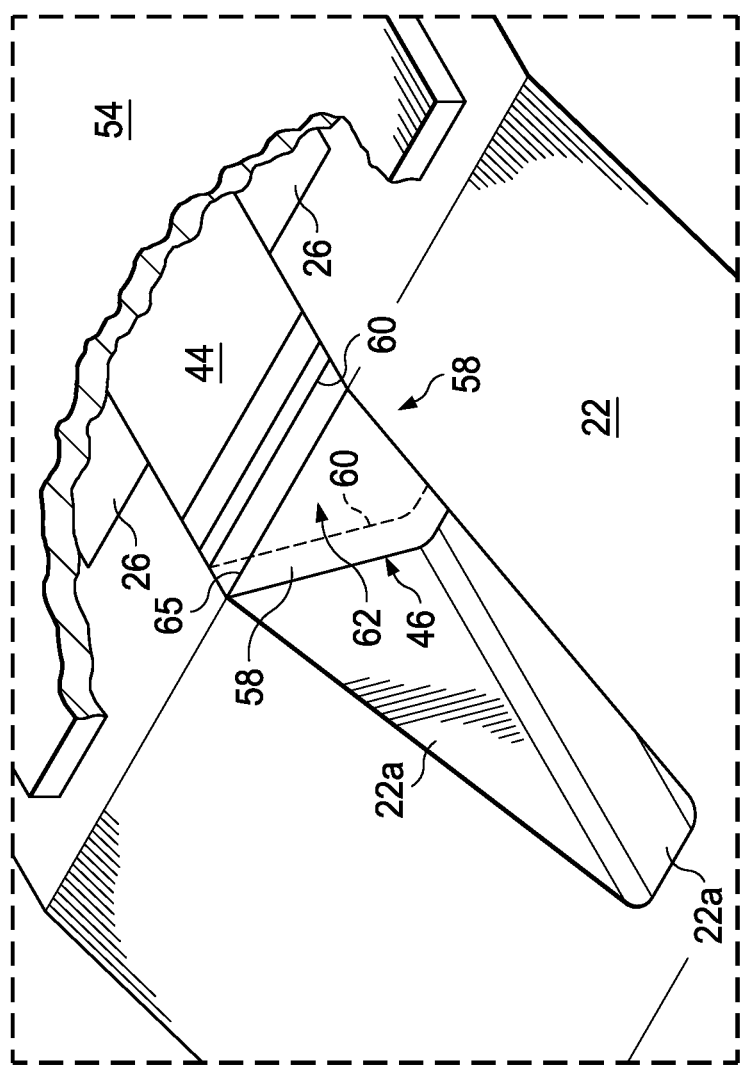
FIG. 13 is an illustration of the area designated as FIG. 12 in FIG. 9, parts of the outer bag having been broken away to reveal a folded end of the film tube, and base plies of the stringer not shown for clarity.

Referring now to FIGS. 9-13, as previously mentioned, and as best seen in FIG. 12, the length $L_{FT}$ of the film tube 45 is greater than the length $L_M$ of the mandrel 48, consequently the outer extremities 58 of the film tube 45 extend beyond the ends of the mandrel 48. The outer extremities 58 of the film tube 45 are folded onto themselves such that a portion 65 the barrier film layer 52 at each end and around the entire circumference of the film tube 45 faces walls 22a (FIGS. 12 and 13) of the tool 22 and the outer vacuum bag 54. An adhesive seal 60, which may comprise, for example and without limitation, an adhesive sealant tape, is applied between the barrier film layer portions 65 and the walls 22a of the tool 22 and the outer vacuum bag 54, thereby forming an substantially air tight seal between film tube 45 and both the outer vacuum bag 54 and the tool 22. Optionally, spreader tools 68 may be temporarily installed 70 into the ends of the film tube 45 in order to prevent of the outer extremities 58 of the film tube 45 from collapsing as the outer extremities 58 are being folded onto themselves. In effect, the film tube 45 forms an inner vacuum bag 44 that is sealed to both the outer vacuum bag 54 and to the tool 22. A seal 56 is installed between the outer vacuum bag 54 and the tool 22 which seals the outer vacuum bag 54 around its entire periphery to the top 36 (FIG. 2) of the tool 22.

With the inner vacuum bag 44 having been installed inside the stringer cavity 32 and sealed to both the tool 22 and the outer bag 54, the mandrel 48 is removed by sliding it through one of the open ends 46 of the inner bag 44. Where the mandrel 48 comprises an inflatable bladder, the bladder is deflated to facilitate easy removal thereof. Depending on the construction of the mandrel 48, a lubricant may be applied to the mandrel 48 to allow the mandrel 48 slide over the surface of the inner bag 44 during removal process.

The assembly of the tool 22, stringer 20 and inner and outer bags 44, 54 are placed in an autoclave (not shown) where the stringer 20 is subjected to autoclave pressure $P_A$ (see FIGS. 1 and 11). Because the ends of the inner bag 44 are open, autoclave pressure $P_A$ is applied within the open interior 62 (FIGS. 11 and 13) of the inner bag 44. The applied autoclave pressure $P_A$ causes the inner bag 44 to maintain its shape without the need for an internal structure, such as a pressurized bladder or other pressurized system other than the autoclave, while applying compaction force to the cap 28 and webs 30. Autoclave pressure $P_A$ is also applied to the outer vacuum bag 54 which causes the flanges 26 of the stringer 20 to be compacted against the top 36 of the tool 22.

Figure 14:
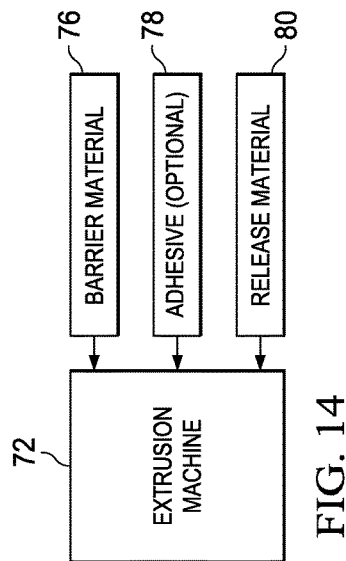
FIG. 14 is an illustration of a block diagram of apparatus for coextruding the film tube.

As previously mentioned, the inner and outer film layers 52, 50 of the film tube 45 may be coextruded. For example, referring to FIG. 14, a liquefied barrier film material 76 and a liquified release film material 80 may be fed to an extrusion machine 72 which extrudes these materials through an extrusion die 74, producing a double layer film tube 45 of any desired length. During the extrusion, the two films bond together, and form a single film.

Depending upon the melt compatibility of the materials being extruded, it may be necessary or desirable to extrude an adhesive 78 between the two film layers 50, 52 to adhere them to each other. Various other processes and machines may be used to produce the film tube 45 including, but not limited to injection and compression molding processes and the like.

Figure 15B:
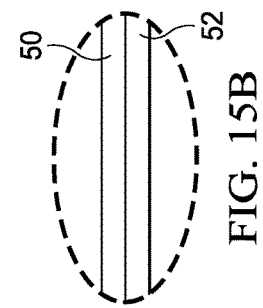
FIG. 15B is an illustration of the area designated as "FIG. 15B" in FIG. 15.
Figure 15A:
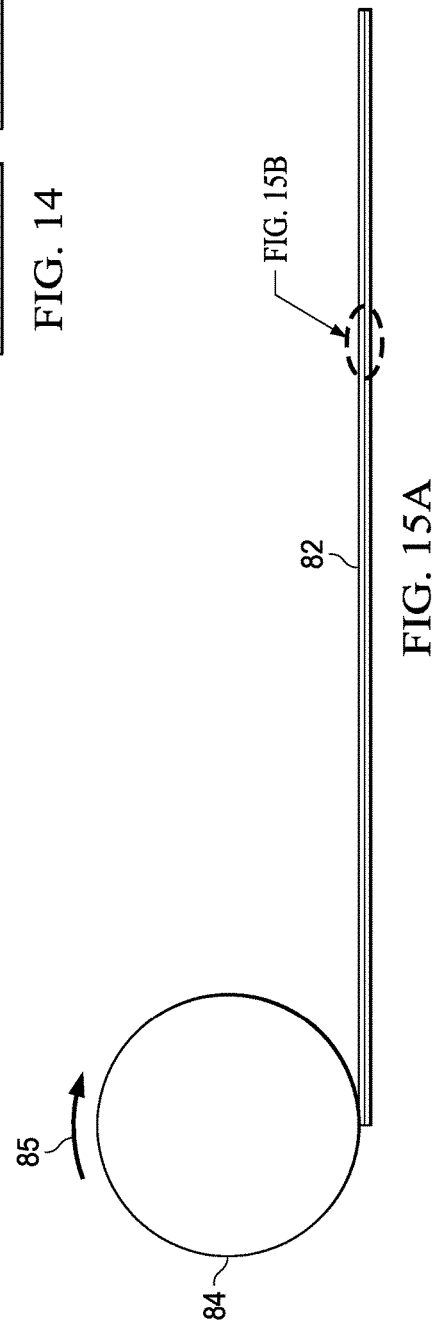
FIG. 15A is an illustration of a diagrammatic side view showing how a film sheet can be rolled into a film tube.

FIG. 15A illustrates another possible technique for producing the film tube 45 in which a flat sheet 82 of material is rolled 85 onto the surface of a cylindrical mandrel 84. The flat sheet 82 may comprise two film layers 50, 52 (FIG. 15B) that are adhered to each other by a layer of adhesive (not shown). In one embodiment, the ends of the flat sheet 82 may be rolled onto each other to form a lap joint (not shown) while in another embodiment, the two ends of the flat sheet may be joined together using any suitable process to form a butt joint (not shown). Other types of joints may be possible.

Figure 16:
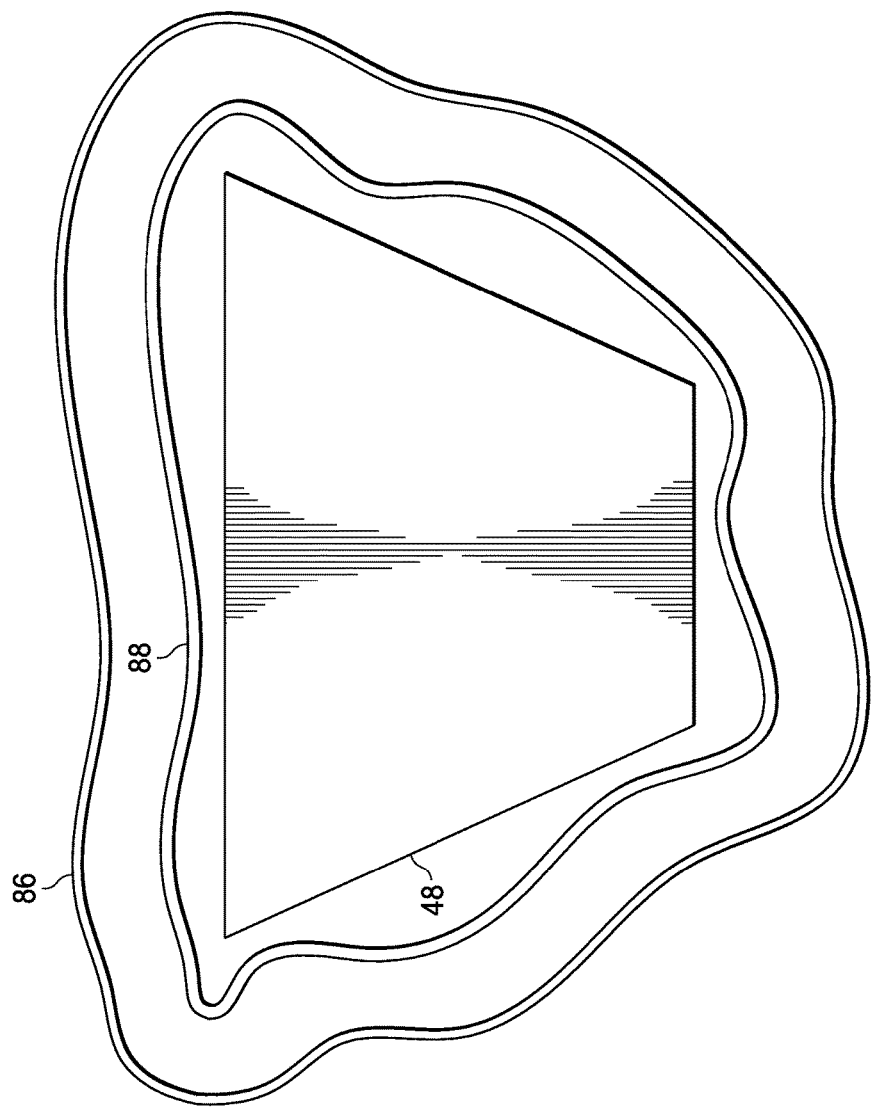
FIG. 16 is an illustration of an end view of the mandrel, showing how two separate film tubes may be sleeved over and shrink-wrapped to the outer surface of the mandrel.
Figure 17:
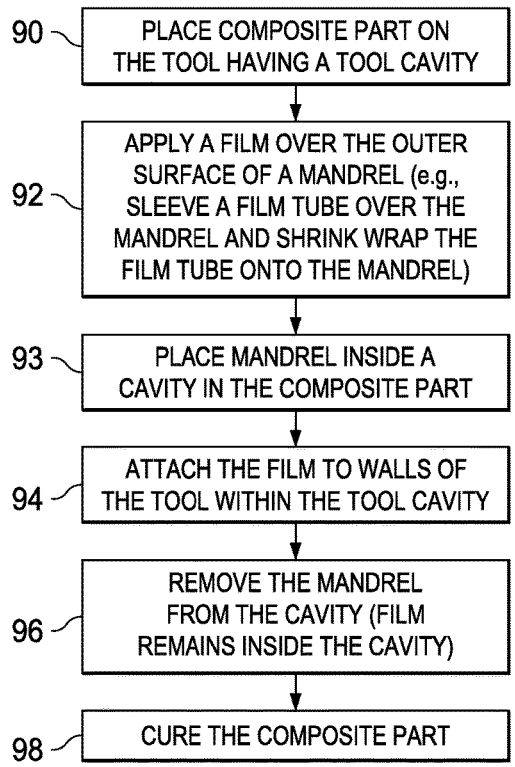
FIG. 17 is an illustration of a flow diagram of a method of curing a composite part.

It may also be possible to form the film tube 45 using a technique illustrated in FIG. 16 in which two separate film tubes 86, 88, respectively comprising a release film and of barrier film, are separately shrink-wrapped onto the mandrel 48. In some embodiments, the inner film tube 88 may be heat shrunk onto the mandrel 48, and the outer film tube 86 may be installed by wrapping and adhesively adhering a film sheet over the heat shrunk inner film tube 88. In still other embodiments, the inner film tube 88 may be formed by wrapping a film sheet around the mandrel 48, and then heat shrinking the outer film tube 86 around the inner film tube 88. FIG. 17 broadly illustrates the overall steps of a method of curing a composite part 20. At 90, a composite part 20 is placed on a tool 22 having a tool cavity 32a. At 92, a film 45 is applied over the outer surface 55 of a mandrel 48, as by sleeving a film tube 45 over the mandrel 48 and then shrink wrapping the film tube 45 onto the surface of the mandrel 48. At 93, the mandrel 48 having the film tube 45 shrink-wrapped thereon is placed inside a cavity 32 in the composite part 20. At 94, the film 45 is attached to bag of the tool within the tool cavity 32a, as by adhesively sealing it to the walls. At 96, the mandrel 48 is removed from the cavity 32a while the film 45 remains inside the cavity 32a attached to the cavity walls. At 98, the composite part 20 is cured.

Figure 18:
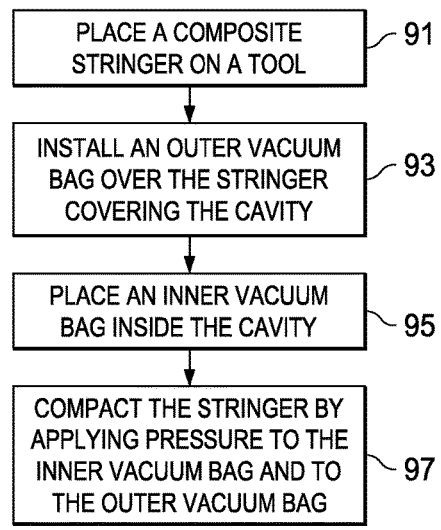
FIG. 18 is an illustration of a flow diagram of a method of curing a composite stringer.

FIG. 18 broadly illustrates the overall steps of a method of making a composite stringer 20. At 91, a composite stringer preform 20 is placed on a tool 22 and at 93, an outer vacuum bag 54 is installed over the stringer 20, covering a cavity 32 in the stringer 20. At 95, an inner vacuum bag 44 is placed inside the cavity 32. At 97, the stringer 20 is compacted by applying pressure to the inner vacuum bag 44 and to the outer vacuum bag 54.

Figure 19:
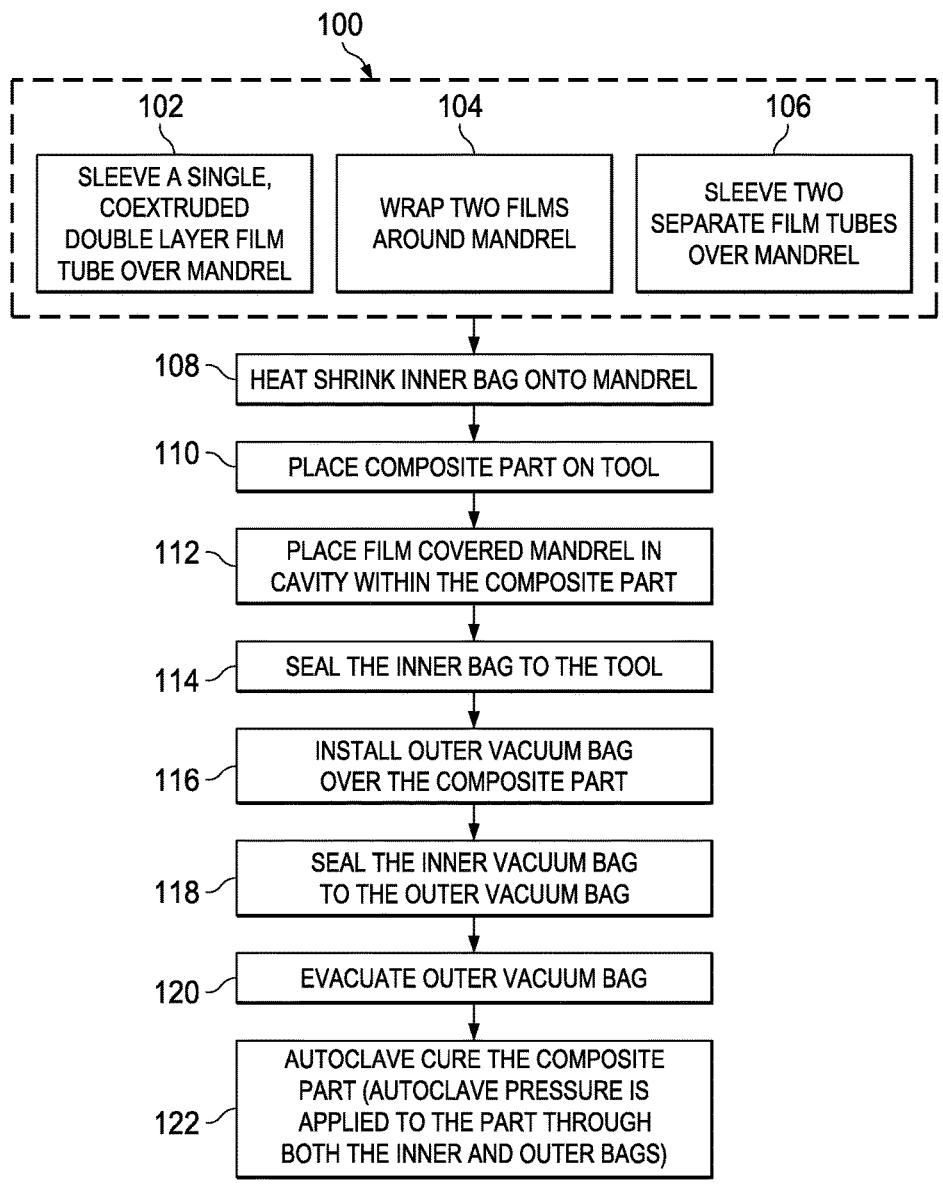
FIG. 19 is an illustration of a flow diagram of an alternate method for curing a composite part.

FIG. 19 illustrates an alternate method of curing a composite part 20. At 100, an inner vacuum bag is formed using any of several techniques. For example, at 102, a single, coextruded double layer film tube 45 may be sleeved over a mandrel 48. Alternatively, two film layers, 50, 52 may be wrapped around the mandrel 48 at 104 or, at 106, two separate film tubes 86, 88 may be sleeved over the mandrel 48. Then, at 108, the inner bag 44 is heat shrunk onto the mandrel 48. At 110, a composite part preform 20 is placed on the tool 22, and at 112 the film covered mandrel 48 is placed in the cavity 32 within the composite part 20. At 114, the inner bag 44 is sealed to the tool 22. At 116, and outer vacuum bag 54 is installed over the composite part 20, and at 118, the inner vacuum bag 44 is sealed to the outer vacuum bag 54. At 120, the outer vacuum bag 54 is evacuated and 122, the composite part 20 is cured in an autoclave where autoclave pressure $P_A$ is applied to the part 20 through both the inner and outer bags, 44, 54.

Figure 20:
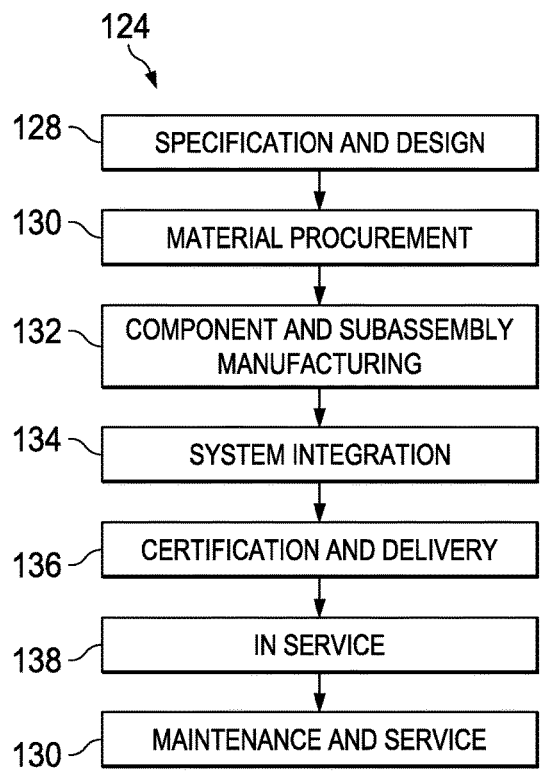
FIG. 20 is an illustration of a flow diagram of aircraft production and service methodology.
Figure 21:
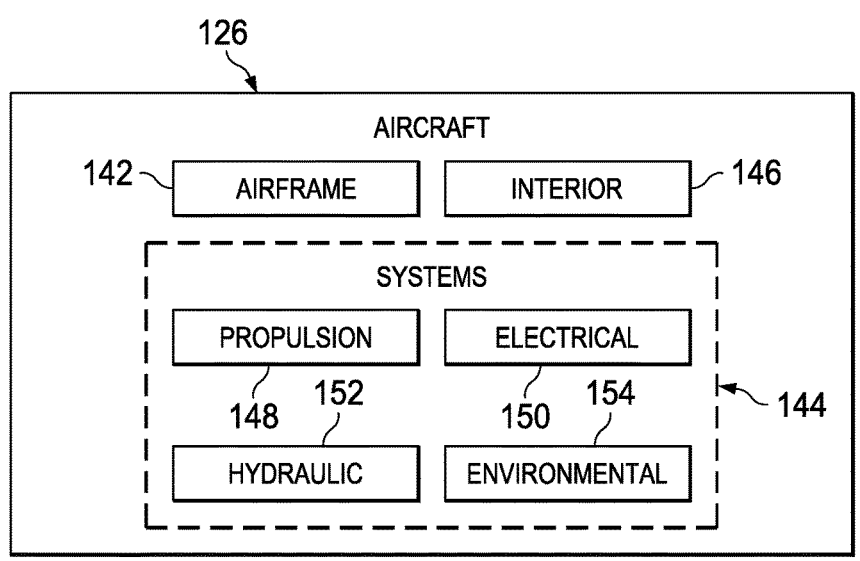
FIG. 21 is an illustration of a block diagram of an aircraft.

Embodiments of the disclosure may find use in a variety of potential applications, particularly in the transportation industry, including for example, aerospace, marine, automotive applications and other application where elongate composite members, such as stiffeners, may be used. Thus, referring now to FIGS. 20 and 21, embodiments of the disclosure may be used in the context of an aircraft manufacturing and service method 124 as shown in FIG. 20 and an aircraft 126 as shown in FIG. 21. Aircraft applications of the disclosed embodiments may include, for example, without limitation, composite laminate spars, stringers and beams. During pre-production, exemplary method 124 may include specification and design 128 of the aircraft 126 and material procurement 130. During production, component and subassembly manufacturing 132 and system integration 134 of the aircraft 126 takes place. Thereafter, the aircraft 126 may go through certification and delivery 136 in order to be placed in service 138. While in service by a customer, the aircraft 126 is scheduled for routine maintenance and service 140, which may also include modification, reconfiguration, refurbishment, and so on. Composite components and parts produced according to the disclosed embodiments may be used in any of component and subassembly manufacturing 132, system integration 134, in service 138 and during maintenance and delivery 140.

Each of the processes of method 124 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

As shown in FIG. 21, the aircraft 126 produced by exemplary method 124 may include an airframe 142 with a plurality of systems 144 and an interior 146. Examples of high-level systems 144 include one or more of a propulsion system 148, an electrical system 150, a hydraulic system 152 and an environmental system 154. Any number of other systems may be included. Although an aerospace example is shown, the principles of the disclosure may be applied to other industries, such as the marine and automotive industries. Composite parts produced according to the disclosed embodiments may be used in the airframe 142 or in the interior 146.

Systems and methods embodied herein may be employed during any one or more of the stages of the production and service method 124. For example, components or subassemblies corresponding to production process 132 may be fabricated or manufactured in a manner similar to components or subassemblies produced while the aircraft 126 is in service. Also, one or more apparatus embodiments, method embodiments, or a combination thereof may be utilized during the production stages 132 and 134, for example, by substantially expediting assembly of or reducing the cost of an aircraft 126. Similarly, one or more of apparatus embodiments, method embodiments, or a combination thereof may be utilized while the aircraft 126 is in service, for example and without limitation, to maintenance and service 140.

As used herein, the phrase "at least one of", when used with a list of items, means different combinations of one or more of the listed items may be used and only one of each item in the list may be needed. For example, "at least one of item A, item B, and item C" may include, without limitation, item A, item A and item B, or item B. This example also may include item A, item B, and item C or item B and item C. The item may be a particular object, thing, or a category. In other words, at least one of means any combination items and number of items may be used from the list but not all of the items in the list are required.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different advantages as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method of processing a composite part, comprising:
placing a composite part on a tool having a tool cavity;
applying a film over an outer surface of a mandrel;
placing the mandrel inside a cavity in the composite part;
folding outer extremities of the film onto itself such that a portion of an inner film layer faces walls of the tool; and
attaching the film to walls of the tool within the tool cavity.

2. The method of claim 1, wherein applying the film over the outer surface of the mandrel includes:
sleeving a film tube over the mandrel; and
shrinking the film onto the mandrel.

3. The method of claim 2, wherein attaching the film to the walls of the cavity includes sealing opposite ends of the film tube to the tool.

4. The method of claim 2, further comprising:
sealing a vacuum bag over the composite part; and
attaching opposite ends of the film tube to the vacuum bag.

5. The method of claim 1, further comprising:
curing the composite part, including applying autoclave pressure to the film inside the cavity.

6. The method of claim 1, wherein applying the film includes shrink wrapping a release film and an air impermeable barrier film onto the mandrel.

7. The method of claim 1, further comprising removing the mandrel from the cavity in the composite part.

8. A method of applying a vacuum bag over a composite part, comprising:
placing the composite part on a tool having a tool cavity;
applying a film over an outer surface of a mandrel;
placing the mandrel inside a cavity in the composite part;
folding outer extremities of the film onto itself such that a portion of an inner film layer faces walls of the tool; and
attaching the film to walls of the tool cavity.

9. The method of claim 8, further comprising removing the mandrel from the cavity in the composite part.

10. A method of bagging a composite part having a cavity therein, comprising:
applying a cavity vacuum bag over an outer surface of a mandrel
folding outer extremities of the cavity vacuum bag onto itself such that a portion of a barrier film layer faces walls of a tool;
applying the cavity vacuum bag over an inner surface of the cavity in the composite part;
applying an outer vacuum bag over the composite part;
sealing the cavity vacuum bag to the outer vacuum bag and to walls of the tool; and
sealing the outer vacuum bag to the tool.

11. A method of fabricating a composite part having a cavity therein, comprising:
placing a flexible inner bag around a mandrel;
shrink wrapping the inner bag onto an outer surface of the mandrel;
placing the composite part on a tool;
placing the mandrel in the cavity;
folding outer extremities of the inner bag onto itself such that a portion of a barrier film layer faces walls of the tool;
sealing the inner bag to the tool;
removing the mandrel from the cavity;
sealing an outer bag over the composite part;
sealing the inner bag to the outer bag; and
curing the composite part in an autoclave.

12. The method of claim 11, wherein placing the flexible inner bag around the mandrel includes:
enveloping the mandrel with an air impermeable inner film; and
enveloping the inner film with an outer release film.

13. The method of claim 11, wherein placing the flexible inner bag includes sleeving a film tube over the mandrel.

14. The method of claim 13, wherein sealing the inner bag to the tool includes sealing outer ends of the film tube to the tool around substantially an entire circumference of the film tube.

15. The method of claim 11, wherein shrink wrapping the inner bag includes applying heat to the flexible inner bag until the inner bag shrinks onto the outer surface of the mandrel.

16. The method of claim 11, wherein sealing the inner bag to the outer bag includes:
adhering the portions of an inner face to the outer bag.

17. The method of claim 11, wherein curing the composite part includes:
placing the composite part and the tool in an autoclave; and
exposing the outer bag and inner bag to autoclave pressure.

18. A method of fabricating a composite stringer having a cavity therein, comprising:
placing a composite stringer charge on a tool;
installing a flexible outer film bag over the composite stringer charge covering the cavity;
placing a flexible inner film bag in the cavity;
folding outer extremities of the inner film bag onto itself such that a portion of an inner film layer faces walls of the tool; and
compacting the composite stringer charge by applying pressure to the inner film bag and the outer film bag.

19. The method of claim 18, wherein placing the inner film bag inside the cavity includes:
shrink wrapping an air impermeable barrier film tube around a mandrel;
placing the mandrel inside the cavity;
attaching the barrier film tube to the tool; and
removing the mandrel from the cavity.

20. The method of claim 18 wherein applying pressure to the inner film bag and the outer film bag is performed by placing the composite stringer charge and the tool in an autoclave, and subjecting the inner and outer film bags to autoclave pressure.

21. The method of claim 18, wherein applying pressure is performed using a common pressure source.

22. The method of claim 21, wherein applying pressure using a common pressure source includes:
placing the composite stringer charge in an autoclave; and
subjecting the inner film bag and the outer film bag to autoclave pressure.

* * * * *